3,230,690
SEPARATION OF ACETYLENE AND ETHYLENE
FROM A MIXED GAS
Kinichi Nishioka, Kurashiki, Japan, assignor to Kurashiki
Rayon Company Limited, Kurashiki, Japan
Filed Apr. 16, 1963, Ser. No. 273,323
4 Claims. (Cl. 55—43)

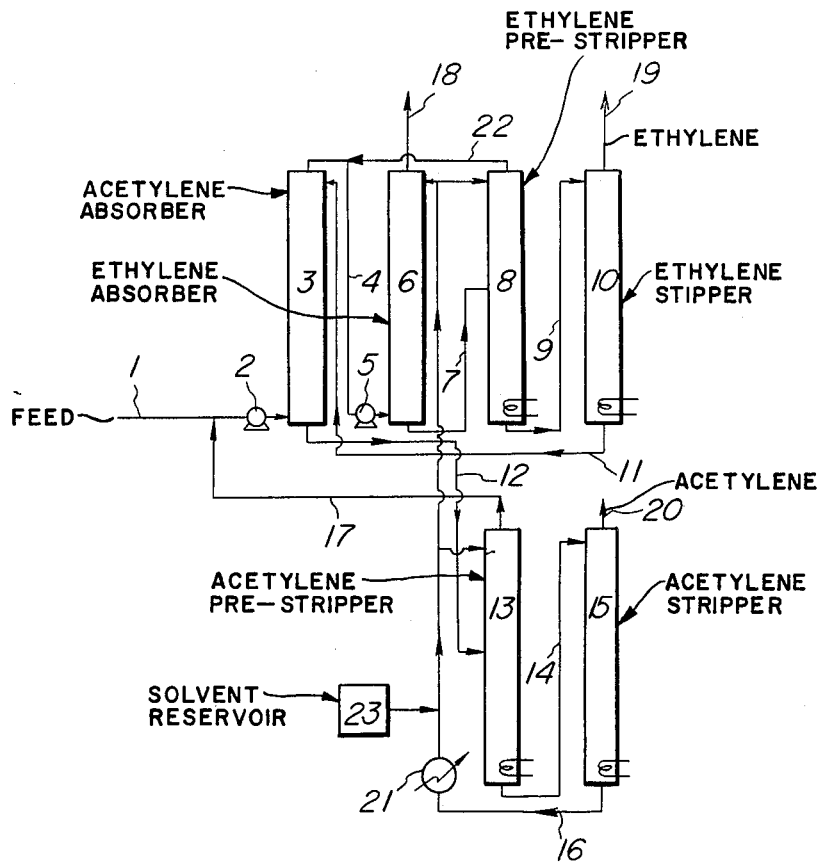

The present invention relates to a method of separating acetylene and ethylene from a gaseous product obtained by the thermal decomposition of saturated or unsaturated hydrocarbons.

The principal object of the invention is to realize the great advantage of simplification of the process, reduction of thermal load and higher yield of products.

In order to separate acetylene and ethylene from gases containing them, processes using a solvent for selectively dissolving acetylene (called an acetylene solvent), such as dimethyl formamide, butyrolactone, methyl pyrrolidone, acetone, methanol, ammonia and the like to absorb and separate acetylene and then using a convenient method to separate ethylene have been well known. For the separation of ethylene, the liquefaction and absorption by hydrocarbons has been known. The above methods are combinations of known processes and almost no interrelationship exists.

In accordance with the invention, processes consisting of a combination of two entirely independent processes are associated with each other by means of an absorption process using a single solvent to attain the object of the invention profitably.

The inventor took into consideration the fact that the solubility of acetylene solvent for ethylene is much less than that for acetylene, but if the temperature is lowered the acetylene solvent can be used satisfactorily as an ethylene absorbing solvent and succeeded in separating acetylene and ethylene from gases containing them by absorption with an acetylene solvent.

In carrying the invention into effect, the absorption of acetylene is effected under pressure, while the partial pressure of acetylene in the gas is selected at the absolute pressure of about 1.4 kg./cm.$^2$. This is due to the fact that in the absorbing operation the higher the pressure of the substance to be absorbed the better is the efficiency, yet when the pressure is over the above limit there is a danger of causing the explosion of acetylene. On the other hand, the absorption of ethylene is effected under a pressure of 30 to 40 atmospheres. One of the reasons is that the Henry constant of ethylene is assumed to be most effective at said pressure. Moreover when ethylene is absorbed by means of acetylene solvent at a temperature lower than that at which acetylene is absorbed it is more effective since the solubility of ethylene is lower, that is, the absorption of ethylene can be effected at a higher pressure and a lower temperature than in the case of acetylene so that ethylene can be separated and purified by utilizing the differences in pressure and temperature at which acetylene and ethylene are absorbed. For example, when acetone is used to absorb acetylene and from the remaining gas ethylene is absorbed at a condition of $-50°$ C. and 40 atmospheres, and if the ethylene laden acetone solution is brought to a condition of $0°$ C. and 10 atmospheres, a greater part of the ethylene is discharged out of the acetone, which can be used directly for the absorption of acetylene. Ethylene remaining in the acetone is driven out during the absorption of acetylene so that it can be recovered again in the ethylene absorbing step and is not lost actually. The acetone solution containing absorbed acetylene yields acetylene by heating it up to its boiling point. The acetone, after being perfectly de-gassed and cooled, can be used again as the absorbing agent for ethylene. In such manner, acetylene and ethylene can be separated respectively. On the other hand, the solvent repeats one cycle of low and high temperatures to separate acetylene and ethylene from each other by one cycle of operation. And since the same solvent can be used in two processes in this method it will be apparent that the apparatus can be simplified.

The invention will be explained further in detail by the accompanying drawing which is a block diagram for carrying out an embodiment of the invention.

Referring to the drawing the gas to be separated, after previously being dried or freed of carbon dioxide gas according to a conventional method, is delivered through pipe 1 and mixed with the gas discharged from the acetylene stripper 13 through pipe 17 and the gas mixture is compressed by a compressor 2 up to the extent that the partial pressure of acetylene does not exceed 1.4 kg./cm.$^2$ and then delivered into the acetylene absorbing tower 3, wherein the pressure is usually 8 to 15 atmospheres. The de-ethylenized solvent coming from the ethylene stripper 10 is delivered through the pipe 11 into the top of the tower 3, wherein the solvent counter-flows against the gas to be separated and absorbs substantially all the ethylene. Since at this time ethylene exists already in a saturated state in the solvent under this condition more cannot be absorbed, yet all of the acetylene and a part of difficult-to-dissolve gases such as methane, hydrogen and the like, existing in the gas mixture dissolve. The solution coming out of the bottom of the tower 3 is delivered through the pipe 12 into the acetylene pre-stripper 13, reducing the pressure to about atmospheric pressure and by a slight heating the difficult-to-dissolve gases and ethylene are discharged from the top of the tower. In this case, the concentration of acetylene in the tower top gas can be reduced by flowing a small amount of solvent from the top of the tower and this gas still contains some acetylene and is taken out through pipe 17 to mix with the gas to be separated.

The solution at the bottom of the tower 13 is delivered through the pipe 14 into the acetylene stripper 15, wherein it is heated to the boiling point of the solvent under normal pressure to be de-gassed and regenerated, and then it is cooled to a predetermined temperature in a cooler 21 and delivered to the ethylene absorbing tower 6. From the top of tower 15 acetylene and higher acetylenes are removed via conduit 20. On the other hand, from the top of the acetylene absorbing tower 3 the gas free from acetylenes is delivered through the pipe 4 to the compressor 5 and is mixed with the gas discharged from the ethylene pre-stripper 8 through pipe 22 and the mixed gas is compressed in the compressor 5 to a pressure at least 3 times greater than the absorbing pressure of acetylene and then enters into the ethylene absorbing tower 6. To the top of tower 6, the solvent from the bottom of said acetylene stripper 15 after being cooled to a predetermined temperature is delivered. In this case, the temperature should be lower than the acetylene absorbing temperature, preferably 15 to 50° C. lower. The ethylene is absorbed in the tower 6 and the difficult-to-dissolve gases such as methane and hydrogen are discharged out of the pipe 18. The solution containing absorbed ethylene is delivered through pipe 7 into ethylene pre-stripper 8, wherein the pressure is partially reduced or the temperature is raised to remove difficult-to-dissolve gases and ethylene. In this case, ethylene may be refluxed by flowing a small amount of solvent from the top of the tower. The difficult-to-dissolve gas still contains ethylene and is delivered from the top of the tower 8 through the pipe 22 to the pipe 4, wherein it is mixed with the tower top gas of the acetylene absorbing tower 3. The sump solution passes via pipe 9 to ethylene stripper 10 and there is maintained at a pressure and temperature approximating the conditions in the acetylene absorbing tower. A greater part of the ethylene is discharged from the top of the tower through pipe 19. The sump solution still containing ethylene in dissolved state is removed via conduit 11 and it can be used as the solvent in the acetylene absorbing tower 3 so that there is no loss. 23 represents a solvent reservoir tank which can be fed as desired at any time. Acetylene and ethylene obtained by the method of the invention contain a small quantity of impurities but it is apparent that such impurities can easily be refined by a conventional process. More particularly, higher acetylenes in the acetylene can be washed and removed prior to the acetylene absorption by means of a small quantity of a common solvent or hydrocarbons.

*Example*

By using a regenerative decomposition furnace and propane as the raw material 200 m.$^3$/hr. of gas having the following composition was obtained.

| | |
|---|---|
| Acetylene | 9.5 |
| Ethylene | 12.2 |
| Hydrogen | 41.0 |
| Methane | 19.2 |
| Carbon monoxide | 4.4 |
| Carbon dioxide | 1.2 |
| Nitrogen | 8.3 |
| Methyl acetylene | 0.37 |
| Diacetylene | 0.07 |

The above gases were washed with an aqueous solution of caustic soda to remove carbon dioxide gas, then dried by means of silica gel and mixed with the gas coming out of the acetylene pre-stripper and the mixture was compressed by means of the first compressor to 10 atmospheric pressures and then made to counter-flow in the acetylene absorbing tower in contact with acetone flowing at the rate of 700 lit./hr. at 0° C. coming from the ethylene stripper, thereby absorbing the total quantity of acetylene. The acetylene laden solvent was then delivered into the acetylene pre-stripper wherein it was brought to atmospheric pressure and heated to 20° C., then the gas of 23 m.$^3$ having the following composition was generated and in this case acetone of 100 lit./hr. was flowed down from the top of the tower.

| | |
|---|---|
| Acetylene | 26.7 |
| Ethylene | 48.5 |
| Hydrogen | 5.1 |
| Methane | 14.1 |
| Carbon monoxide | 1.3 |
| Nitrogen | 2.5 |

This gas was mixed with said raw material gas to be reused. The solution from the bottom of the stripped tower was delivered into the acetylene stripper and heated at its bottom to a temperature of 56° C. and regenerated. The regenerated acetone was cooled and reused for the ethylene absorbing solution. Thus 19.2 m.$^3$/hr. of acetylene having 97% purity were recovered from the top of the tower. On the other hand, the gases having the following compositions coming out of the top of the acetylene absorbing tower were mixed with the gas from the ethylene pre-stripper and after being compressed in the second compressor up to 45 atmospheres were delivered into the ethylene absorbing tower and were made to counter-flow in contact with acetone of 700 lit./hr. cooled to −50° C.

| | |
|---|---|
| Ethylene | 18.6 |
| Hydrogen | 42.3 |
| Methane | 23.5 |
| Carbon monoxide | 6.0 |
| Nitrogen | 8.0 |

From the top of the tower, 145 m.$^3$/hr. of gas having the following composition were produced.

| | |
|---|---|
| Hydrogen | 53.2 |
| Methane | 26.3 |
| Carbon monoxide | 6.2 |
| Nitrogen | 11.4 |

The solution containing absorbed ethylene was then delivered into the ethylene pre-stripper and reduced to a pressure of 30 atmospheres and raised to a temperature of −30° C. then gases having the following composition were produced by flowing acetone at the rate of 100 lit./hr. from the top of the tower.

| | |
|---|---|
| Ethylene | 58.0 |
| Methane | 23.5 |
| Carbon monoxide | 2.4 |
| Nitrogen | 4.9 |
| Hydrogen | 9.3 |

This gas was mixed with the gas from the top of the acetylene absorbing tower and recycled. The sump solution from the pre-stripper was brought to 0° C. and 10 atmospheres in the ethylene stripper and yielded from the top of the tower 23 m.$^3$/hr. of ethylene having 96% purity. The ethylene free from acetone still contained some ethylene, yet it can be used for absorbing ethylene.

What I claim is:

1. A method for separating acetylene and ethylene from a mixed gas which comprises:
    absorbing acetylene therefrom by contact of said mixed gas at superatmospheric pressure and at a predetermined temperature with a suitable solvent for acetylene;
    compressing the de-acetylenized gas to an elevated pressure level at least three-fold that of the acetylene absorption;
    stripping acetylene from the acetylene enriched solvent;
    chilling the stripped de-acetylenized solvent to a temperature level at least 15° C. below that of the acetylene absorption;
    absorbing ethylene from the compressed de-acetylenized gas by contact with the chilled solvent at the elevated pressure level;
    warming and lowering the pressure of the ethylene-enriched solvent to about the pressure-temperature conditions employed for the acetylene absorption to release ethylene therefrom;
    and then directly cycling the so de-ethylenized solvent to the acetylene absorption, thereby employing for acetylene absorption in the solvent and for ethylene release from the solvent essentially the same pressure-temperature conditions.

2. The process of claim 1 wherein prior to stripping the acetylene enriched solvent, the solvent is prestripped to remove therefrom some absorbed gas, the gas being recycled to join the feed stream of mixed gases entering the acetylene absorption step.

3. The process of claim 1 wherein prior to de-ethylenizing the ethylene enriched solvent, the solvent is pre-stripped to remove therefrom some absorbed gas, the gas being recycled to join the de-acetylenized gaseous effluent from the acetylene absorption step.

4. A method as defined in claim 1, wherein the acetylene is absorbed at a temperature of approximately 0° C. and at a pressure in the range of about 8–15 atmospheres.

References Cited by the Examiner

UNITED STATES PATENTS

| | | | |
|---|---|---|---|
| 2,809,710 | 10/1957 | Hachmuth | 55—46 |
| 2,891,633 | 6/1959 | Morro et al. | 55—65 |
| 3,023,842 | 3/1962 | Grover et al. | 55—48 |
| 3,071,912 | 1/1963 | Akin | 55—64 |
| 3,087,310 | 4/1963 | Rottmayr | 55—64 |

REUBEN FRIEDMAN, *Primary Examiner.*

A. NOZICK, *Assistant Examiner.*